No. 789,986. PATENTED MAY 16, 1905.
J. MARSDEN.
PNEUMATIC TIRE SHIELD.
APPLICATION FILED JAN. 6, 1905.

WITNESSES,
Chas. E. Chapin.

INVENTOR,
Joseph Marsden
By Geo. H. Strong atty.

No. 789,986. Patented May 16, 1905.

UNITED STATES PATENT OFFICE.

JOSEPH MARSDEN, OF SAN FRANCISCO, CALIFORNIA.

PNEUMATIC-TIRE SHIELD.

SPECIFICATION forming part of Letters Patent No. 789,986, dated May 16, 1905.

Application filed January 6, 1905. Serial No. 239,879.

*To all whom it may concern:*

Be it known that I, JOSEPH MARSDEN, a citizen of the United States, residing in the city and county of San Francisco and State of California, have invented new and useful Improvements in Pneumatic-Tire Shields, of which the following is a specification.

My invention relates to a means for protecting pneumatic tires from puncture and at the same time maintaining the resiliency of such tires under the varying pressure of loads and shocks.

It comprises combinations of parts and details of construction, which will be more fully explained by reference to the accompanying drawings, in which—

Figure 1:
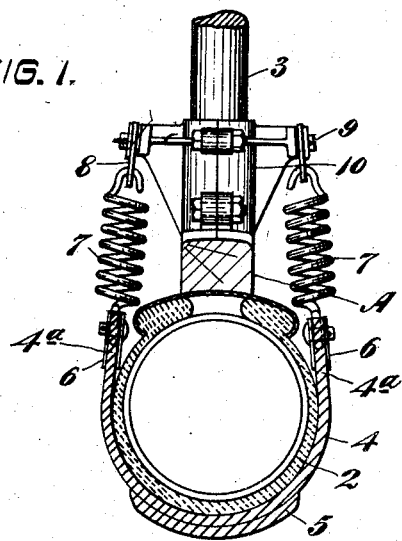
Figure 2:
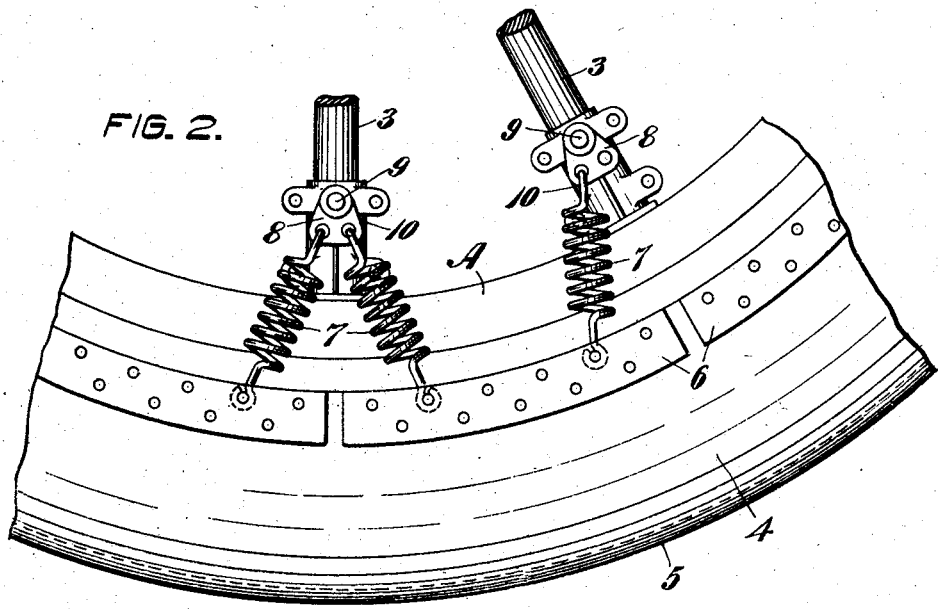

Figure 1 is a transverse section of my shield, showing its application to a tire. Fig. 2 is a partial side elevation of same.

Various devices have been produced with the design of protecting pneumatic tires from puncture and other injury. Such devices when formed of flexible material have usually been laced or otherwise attached to directly inclose the tire and the rigid rim in which said tire is carried, and the resiliency of the tire is thus greatly reduced.

It is the object of my invention to provide a protecting envelop or casing surrounding that portion of the tire which is subject to puncture or abrasion and to so connect the free edges of this casing with supporting parts that the casing itself will partake of the compressions and extensions of the inclosed tire under loads, and thus allow the air within the latter to exercise its full resilient action under compression and expansion.

In the drawings I have here shown a sufficient transverse section and side elevation of the tire to illustrate my invention.

The rim A of the wheel may be of any suitable or well-known construction adapted to retain the tire 2 in its proper position, and 3 represents the spokes of the wheel. These parts being of ordinary construction are only indicated in the present drawings.

The shoe 4, which is a feature of my invention, is a band of any suitable soft flexible leather or equivalent material which can be formed to inclose the tire and which will be impervious to puncture or ordinary accident. This shoe may have a supplemental reinforce, as at 5, inclosing its tread portion and surrounding the tire. The shoe 4 is formed to inclose the outer half of the periphery of the tire, as is shown in the section, and its edges instead of being drawn in close to the rim or laced thereto stand away from the inner curvature of the tire, as shown at 4ª, and these edges have secured to them metallic plates, as at 6. One of these plates may be secured upon the outside and the other upon the inside and may be riveted through the material of the shoe, as shown. These plates are preferably not continuous, but are separated from each other at short intervals, as shown in the side view, so as to allow a sufficient space for such radial tension and movement of the shoe as its office will require. In order to maintain the shoe at the proper tension in close contact with the tire around its outer periphery and at the same time to allow it to yield when the tire is compressed and to extend itself when the tire again expands, springs 7 are connected by pins or bolts with the edges of the shoe, and by reason of the clamping-plates 6 these pins are strongly held and will not tear out from their attachments. The inner ends of the springs 7 are connected by any suitable attachment, and preferably with the wheel-spokes, as shown. The springs may also be made of any suitable character. In the present case I have shown spiral springs, and the inner ends are connected with swivel-plates 8. These plates are here shown as made triangular in shape for symmetry and have their inner ends swiveled and turnable upon trunnions, as at 9, formed at the ends of clamps 10, which are adapted to be firmly secured to the wheel-spokes. The swivel-plates are loosely turnable upon the trunnions and may be secured in place by washers and cotter-pins or equivalent attachments. In order to provide a sufficient number of substantially equally spaced connections between the springs and the shoe, the springs are here shown as being divergent and connecting with the pins which attach them to the edges of the shoe at about equal distances from each other, so that there is an even pull upon the shoe to hold it in contact with the outer periphery of the tire. The resiliency of the springs being substantially in the direction of compression as the lower part of the shoe and tire come in contact with the road, it will be seen that the springs will successively contract to take up the shoe as the tire is compressed, and as the period of compression passes the elasticity of the tire will again expand the springs. The shoe is thus always maintained in close contact with the tire and will follow all compressions and extensions thereof, offering no resistance and in no way interfering with the proper resilience of such tire.

Having thus described my invention, what I claim, and desire to secure by Letters Patent, is—

1. A protector for pneumatic tires comprising a shoe inclosing the outer periphery of the tire, elastic connections with said shoe whereby it is maintained in contact with and follows the compressions and extensions of the tire, and rocking means between the connections and a rigid portion of the wheel.

2. A protector for pneumatic tires consisting of a shoe inclosing the outer periphery of the tire, springs connecting with the shoe, and attachments including rocking members for the inner ends of said springs intermediate between the rim and center of the wheel.

3. A protector for pneumatic tires consisting of a shoe inclosing the outer periphery of the tire having its edges free, springs having the outer ends connected with said edges at intervals, swiveled attachments for the inner ends of said springs, and means for securing said attachments to the wheel-spokes.

4. A protector for pneumatic tires, consisting of a shoe inclosing the outer periphery of the tire, and having inwardly-extending free edges, reinforcing-plates fixed to the edges, and springs having one end connected with the edges of the shoe, and means whereby the other ends are pivotally attached at fixed points interior to the rim.

5. A tire-protector consisting of a shoe inclosing the outer portion of the tire and having its inner edges substantially tangent with the segmental outer portion, springs disposed in pairs with their outer ends connected with the edges of the shoe, and swiveled plates to which each pair of springs converge and are connected.

6. A tire-protector consisting of a segmental shoe inclosing the outer part of the tire, and having the inner edges tangent therewith, carriers fixed at points interior to the rim, plates swiveled and turnable upon the carriers and springs connected in pairs with said plates, diverging outwardly therefrom and having their outer ends connected with the edges of the shoe.

In testimony whereof I have hereunto set my hand in presence of two subscribing witnesses.

JOSEPH MARSDEN.

Witnesses:
  S. H. NOURSE,
  HENRY C. DROGER.